(12) United States Patent
Smutny et al.

(10) Patent No.: US 7,026,549 B1
(45) Date of Patent: Apr. 11, 2006

(54) COLLAPSIBLE GROMMET

(75) Inventors: Dale J. Smutny, Canfield, OH (US);
Terry L. Chapin, Cortland, OH (US);
Masahiro Yoshino, Kanagawa (JP);
Dale W. Kirk, Killbuck, OH (US);
Paul W. Miller, Millersburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/051,833

(22) Filed: Feb. 4, 2005

(51) Int. Cl.
*H02G 3/08* (2006.01)

(52) U.S. Cl. .............. 174/65 G; 174/153 G; 174/152 G; 16/2.1; 16/2.2; 248/56

(58) Field of Classification Search .............. 174/65 G, 174/152 R, 152 G, 153 G, 135, 142, 65 R, 174/151; 16/2.1, 2.2; 248/96, 56; 439/604, 439/587, 274, 275
See application file for complete search history.

(56) References Cited

U.S. PATENT DOCUMENTS

| | | | |
|---|---|---|---|
| 4,289,924 A | | 9/1981 | Pearce, Jr. et al. |
| 5,732,440 A | | 3/1998 | Wright |
| 5,774,934 A | * | 7/1998 | Fujita et al. ................ 16/2.1 |
| 6,058,562 A | * | 5/2000 | Satou et al. ............ 174/153 G |
| 6,486,400 B1 | * | 11/2002 | Smutny et al. ......... 174/152 G |
| 6,495,767 B1 | * | 12/2002 | Okuhara et al. .......... 174/65 G |
| 6,603,078 B1 | * | 8/2003 | Okuhara et al. ........ 174/153 G |
| 6,685,195 B1 | * | 2/2004 | Uchida et al. .......... 174/153 G |
| 6,825,416 B1 | * | 11/2004 | Okuhara ................. 174/153 G |

FOREIGN PATENT DOCUMENTS

| | | |
|---|---|---|
| JP | 2002-171644 | 6/2002 |
| JP | 2002-171645 | 6/2002 |
| JP | 2002-171646 | 6/2002 |
| JP | 2002-171647 | 6/2002 |

* cited by examiner

*Primary Examiner*—Angel R. Estrada
(74) *Attorney, Agent, or Firm*—David P. Wood

(57) ABSTRACT

A one-piece, molded elastomeric grommet for mounting in a hole that extends through a support panel for passing a member through the support panel has an elongate tubular portion defining a passage that extends from an inlet at one end of the tubular portion to an exit at an opposite end of the tubular portion. An umbrella portion surrounds the tubular portion and has a forward end that is integrally attached to the tubular portion so as to form an open ended acoustic chamber outwardly of the tubular portion. A mounting portion at a rearward end of the umbrella portion comprising a forward mounting flange and the umbrella portion includes a collapsible wall having a substantially uniform thickness and an undulate shape in a circumferential direction to facilitate insertion of the forward mounting flange through an undersized hole in a support panel.

12 Claims, 5 Drawing Sheets

COLLAPSIBLE GROMMET

FIELD OF THE INVENTION

This invention relates to grommets and more particularly to collapsible grommets for sealing around a member that passes through a hole in a panel.

BACKGROUND OF THE INVENTION

Grommets that pass through a hole in a panel and are secured to the panel by cooperating forward and rearward flanges of the grommet that engage opposite sides of the panel are well known. The panel hole, of necessity has a smaller diameter than the mounting flanges that secure the grommet to the panel. See for instance, U.S. Pat. No. 5,732,440 granted to John O. Wright Mar. 31, 1998.

An ongoing challenge with such grommets is to reduce the insertion force required to push the grommet part way through the panel hole so that the forward mounting flange passes through the panel hole to engage the back side of the panel while insuring adequate retention by the forward mounting flange after it is pushed through the panel hole. Thus there is a need for a grommet that requires a relatively low insertion force to push the grommet part way through a panel hole while providing a relatively high retention force preventing the grommet from being pulled back out through the panel hole.

Another challenge with grommets such as those disclosed in the '440 patent is sealing around the member that passes through the grommet when the member is not round, such as in the case of a bundle of wires that pass through the grommet. While the Wright '440 does not address this problem, it is generally known to seal around non round members such as a bundle of wires with potting techniques. See for instance, U.S. Pat. No. 4,289,924 granted to Warren Peace, Jr. et al. Sep. 15, 1981.

Japanese Publications 2002-171644, 2002-171645, 2002-171646 and 2002-171647 of Jun. 14, 2002 disclose a grommet that purportedly reduces the insertion force required for mounting a grommet in a panel hole by designing the grommet so that the grommet has a collapsible bell-shaped wall leading up to a forward mounting flange. This collapsible bell shaped wall is characterized by a plurality of thick radial outer ribs joined by thin sections that have outer recesses. The collapsible bell-shaped wall also has internal radial ribs between the thin sections. In addition, the grommet has a radial wall and sleeve at the back of the rearward mounting flange that is split into two parts to facilitate collapse of the bell shaped wall upon insertion of the grommet part way into the panel hole.

The grommet disclosed in the Japanese publications is difficult to mold because of the complicated shape of the collapsible bell-shaped wall. Moreover, the grommet disclosed in the Japanese publications does not lend itself to sealing a bundle of wires or other non round member with a potting technique because of the large interior space inside the bell shaped wall and the spit radial wall and sleeve at the back of the rearward mounting flange.

SUMMARY OF THE INVENTION

A one-piece, molded elastomeric grommet for mounting in a hole that extends through a support panel for passing a member through the support panel comprises an elongate tubular portion defining a passage that extends from an inlet at one end of the tubular portion to an exit at an opposite end of the tubular portion. An umbrella portion surrounds the tubular portion and has a forward end that is integrally attached to the tubular portion so as to form an open ended acoustic chamber outwardly of the tubular portion. A mounting portion at a rearward end of the umbrella portion comprising a forward mounting flange. The umbrella portion includes a collapsible wall having a substantially uniform thickness and an undulate shape in a circumferential direction to facilitate insertion of the forward mounting flange through an undersized hole in a support panel.

This invention provides a collapsible grommet for passing a bundle of wires or other non round member through a panel hole that requires a relatively low insertion force for pushing the grommet part way through the panel hole while providing a relatively high retention force to resist pulling the grommet back out through the panel hole.

The collapsible grommet is simple in shape and consequently relatively easy and economical to mold. The grommet also is preferably shaped to seal a bundle of wires or other non round member passing through the grommet by a potting technique that is economical.

DETAILED DESCRIPTION OF PREFERRED EMBODIMENT

Figure 8:
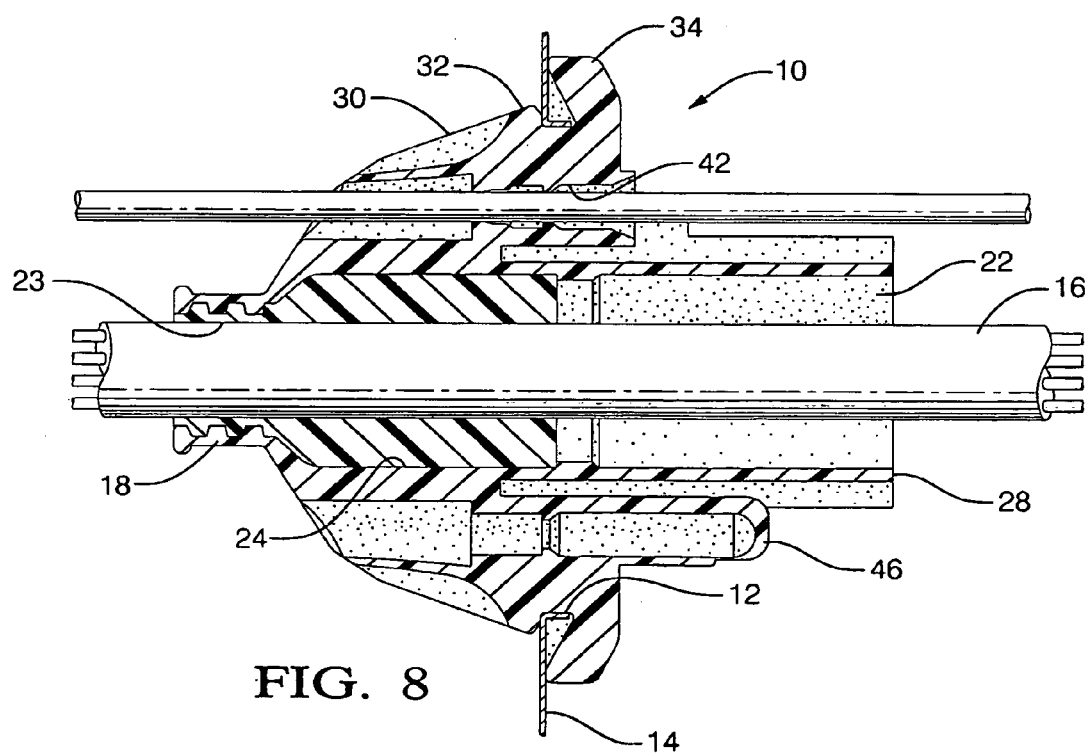
FIG. 8 is a longitudinal cross section of the grommet of FIG. 1 mounted in a support panel and potted.

Referring now to the drawing, the invention is embodied in a one-piece, molded elastomeric collapsible grommet 10 for mounting in a hole 12 that extends through a support panel 14 for passing a bundle of wires 16 through the hole in the support panel as shown in FIG. 8. Grommet 10 comprises a seal sleeve 18 at one end that is part of an elongate tubular portion 20 defining a passage 22 for the bundle of wires 16. Passage 22 comprises an exit opening 19 at one end for a forward seal chamber 23 that communicates with a larger intermediate chamber 24 that communicates with an even larger rearward chamber 26 forming an enlarged inlet 28 at a rearward end of the tubular portion 20 and passage 22.

Figure 4:
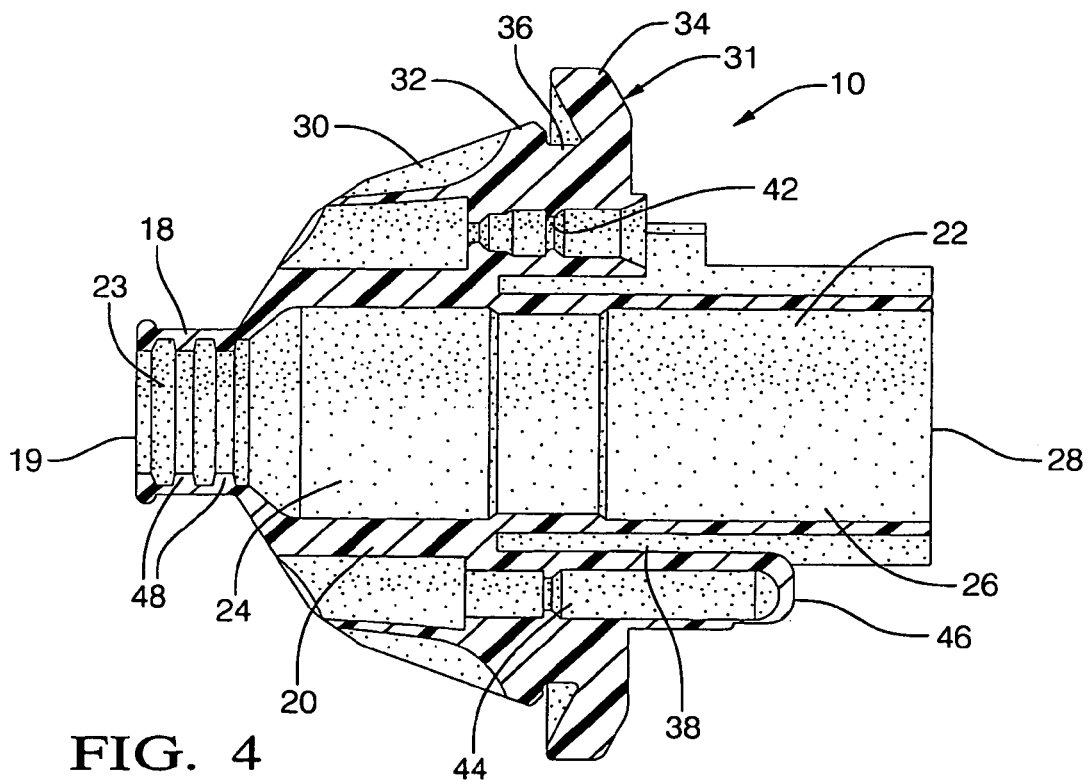
FIG. 4 is a longitudinal section taken substantially along the line 4—4 of FIG. 1 looking in the direction of the arrows.
Figure 5:
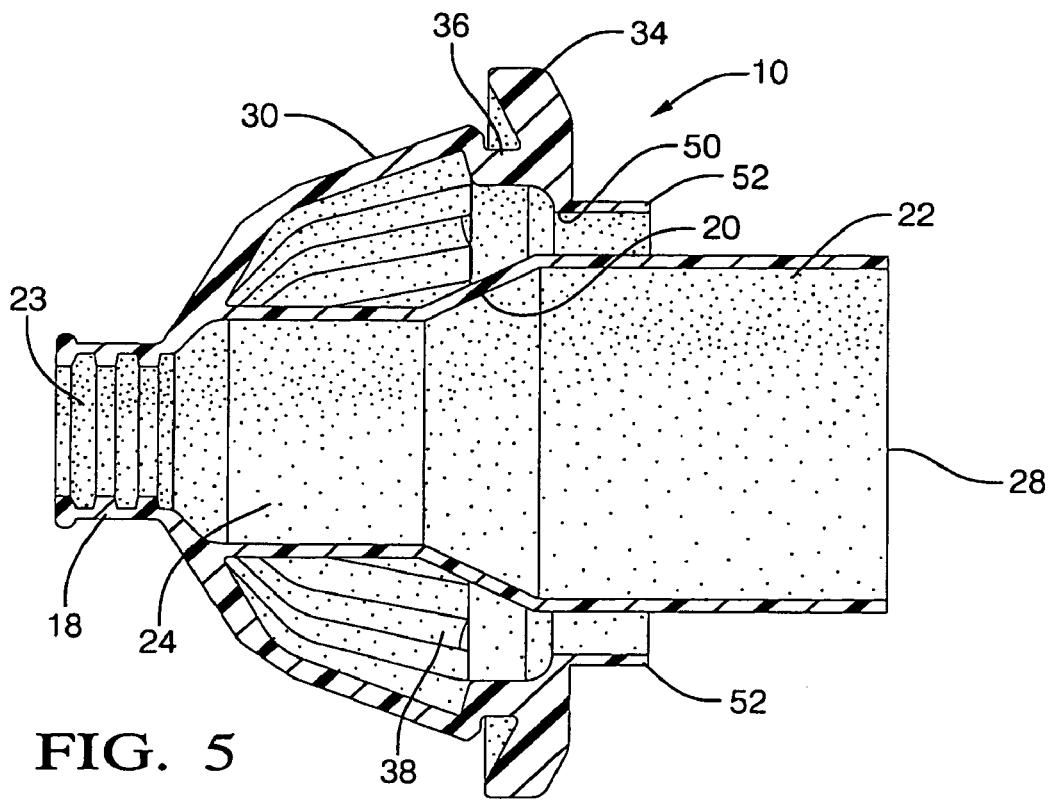
FIG. 5 is a longitudinal section taken substantially along the line 5—5 of FIG. 1 looking in the direction of the arrows.
Figure 6:
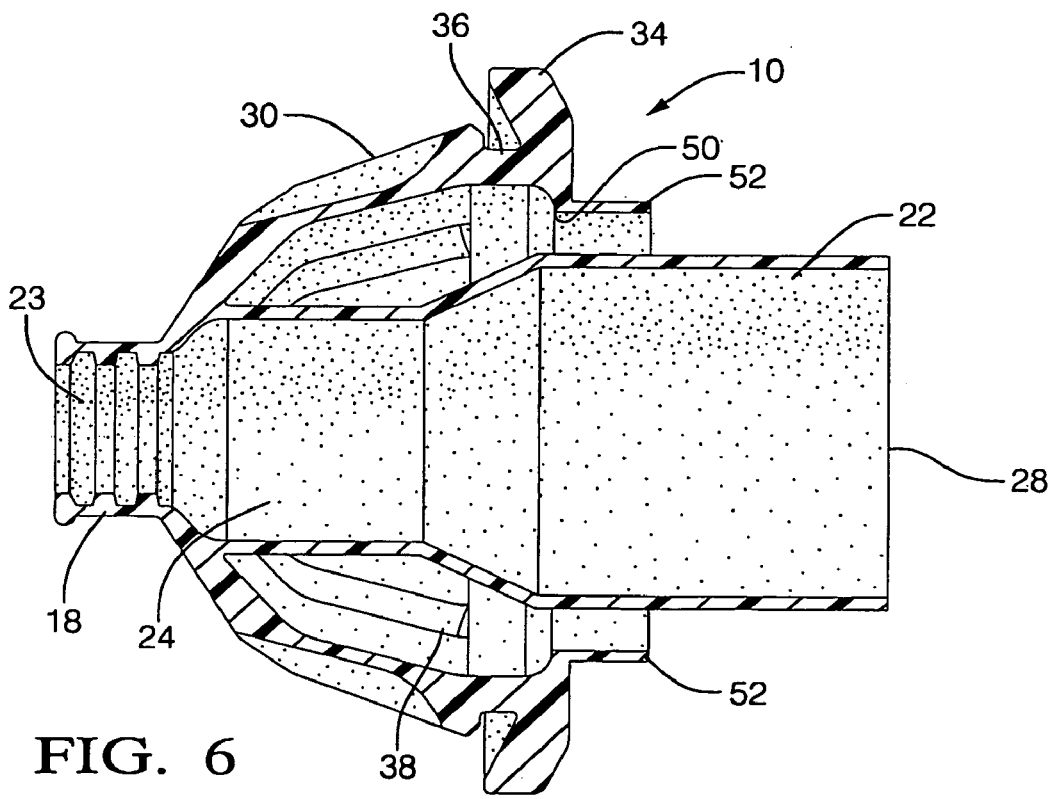
FIG. 6 is a longitudinal section taken substantially along the line 6—6 of FIG. 1 looking in the direction of the arrows.

Grommet 10 further comprises a collapsible bell shaped wall 30 that has one end integrally attached to a rearward portion of the seal sleeve 18. The collapsible bell-shaped wall 30 forms an umbrella portion that surrounds the larger intermediate chamber 24 and a forward portion of the even larger rearward chamber 26 as best shown in FIGS. 4, 5 and 6.

Grommet 10 has a mounting portion 31 at the rearward end of the bell-shaped wall 30 comprising forward and rearward mounting flanges 32 and 34 on opposite sides of an annular groove 36 that is shaped to receive the annular edge of the mounting panel 14 around the panel hole 12 as shown in FIG. 8. An open ended acoustic chamber 38 is formed outwardly of the tubular portion 20 by the tubular portion 20 on the one hand and the bell-shaped wall 30 and the mounting portion 31 on the other hand.

Figure 1:
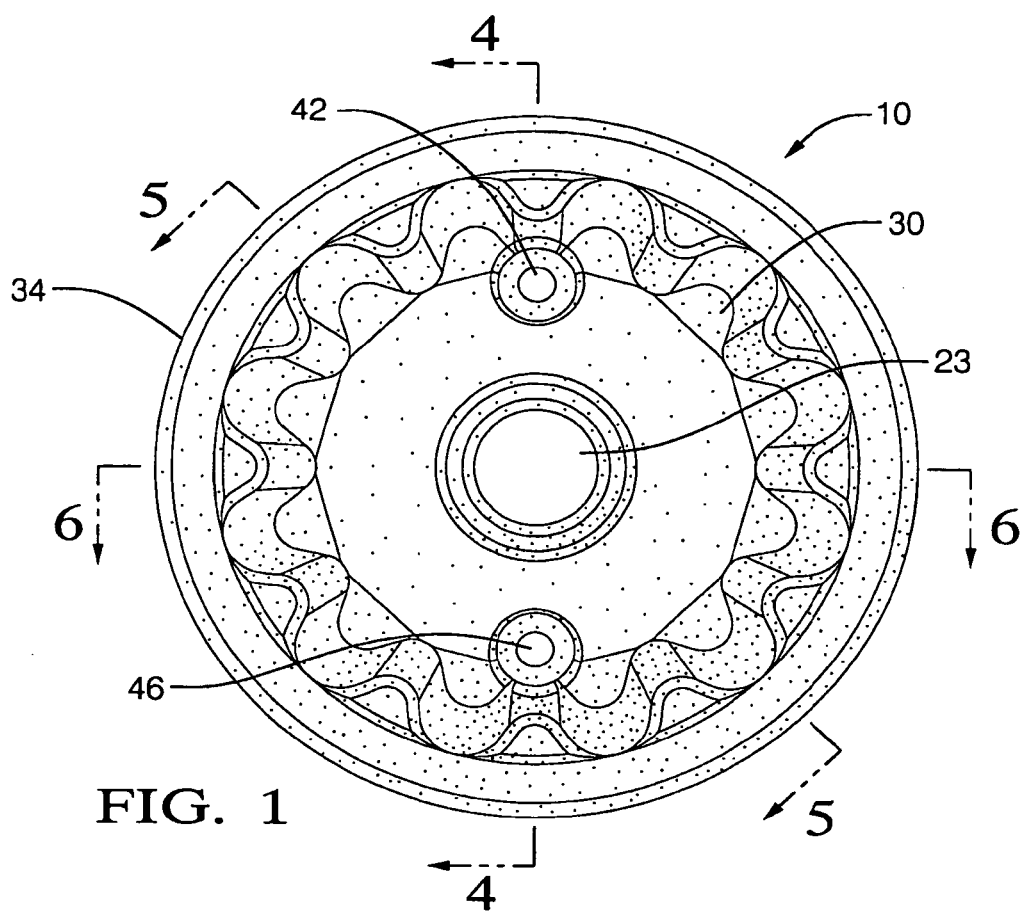
FIG. 1 is a front view of a collapsible grommet that embodies the invention.
Figure 2:
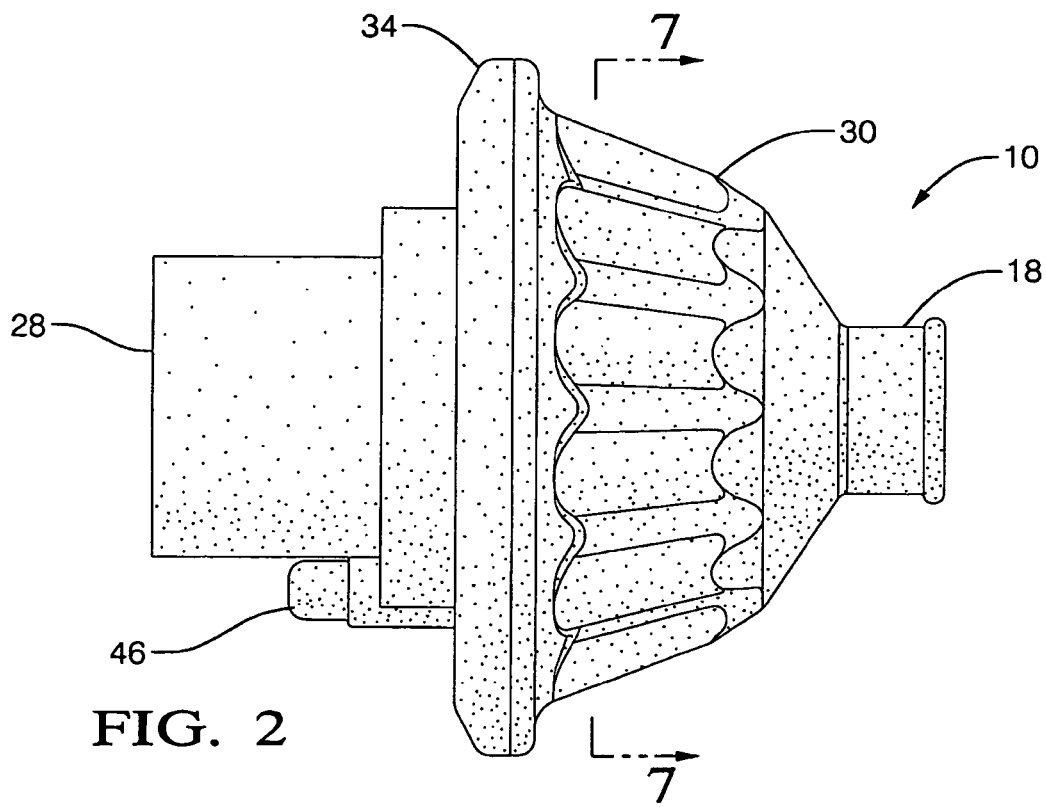
FIG. 2 is a side view of the collapsible grommet that is shown in FIG. 1.
Figure 3:
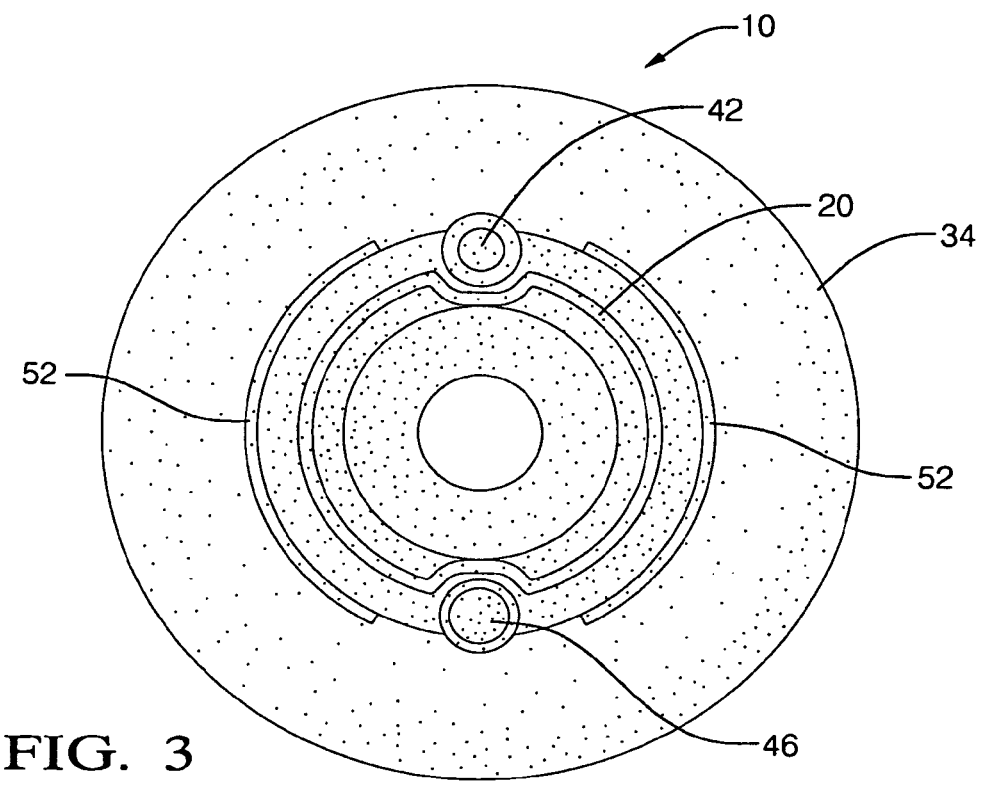
FIG. 3 is a rear view of the collapsible grommet that is shown in FIG. 1.

Grommet 10 has two integral axially oriented tubes 42 and 44 passing through the acoustic chamber 38 on opposite diametrical sides of the tubular portion 20 which is shaped to accommodate tubes 42 and 44 as best shown in FIG. 3. Tubes 42 and 44 are an optional feature for passing round members, such as single wires through the grommet in addition to the bundle of wires 16 or other non round member that passes through the passage 22. In this regard one or both of the tubes may have a severable end cap to close off the tube (such as the integral severable end cap 46 shown in FIG. 4) until the tube is used.

Figure 7:
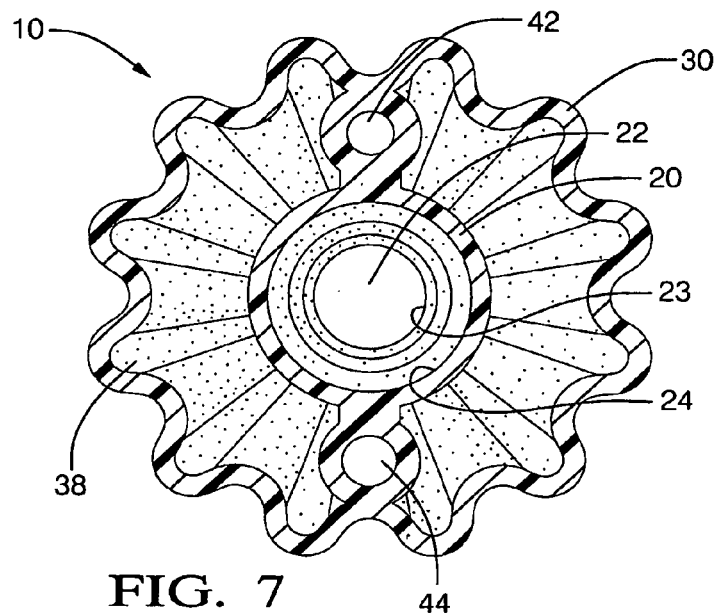
FIG. 7 is a cross section taken substantially along the line 7—7 of FIG. 2 looking in the direction of the arrows.

The forward mounting flange 32 of necessity has an outer diameter that is larger than the outer diameter of the panel hole 12 that extends through the support panel 14. Consequently, the generally bell-shaped wall 30 is collapsible. More specifically, the generally bell-shaped wall 30 has an intermediate portion of substantially uniform thickness and an undulate shape in a circumferential direction, as best shown in FIG. 7. This intermediate portion collapses upon forceful insertion into the panel hole 12 to facilitate insertion of the forward mounting flange 32 through the panel hole 12 in the support panel 14.

When the collapsible grommet 10 is mounted in the panel hole 12 as shown in FIG. 8, the passage 22 is preferably sealed by filling the intermediate chamber 24 with a suitable sealant, such as polyurethane, which pots the portion of the bundle of wires in the intermediate chamber 24 as best shown in FIG. 8. Preferably, the bundle of wires have a cross sectional area that is no greater than 40% of the minimum cross sectional area of the intermediate chamber 24. The seal sleeve 18 also preferably includes sealing ribs 48 that project into forward chamber 23 to seal around the bundle of wires 16.

Figure 9:
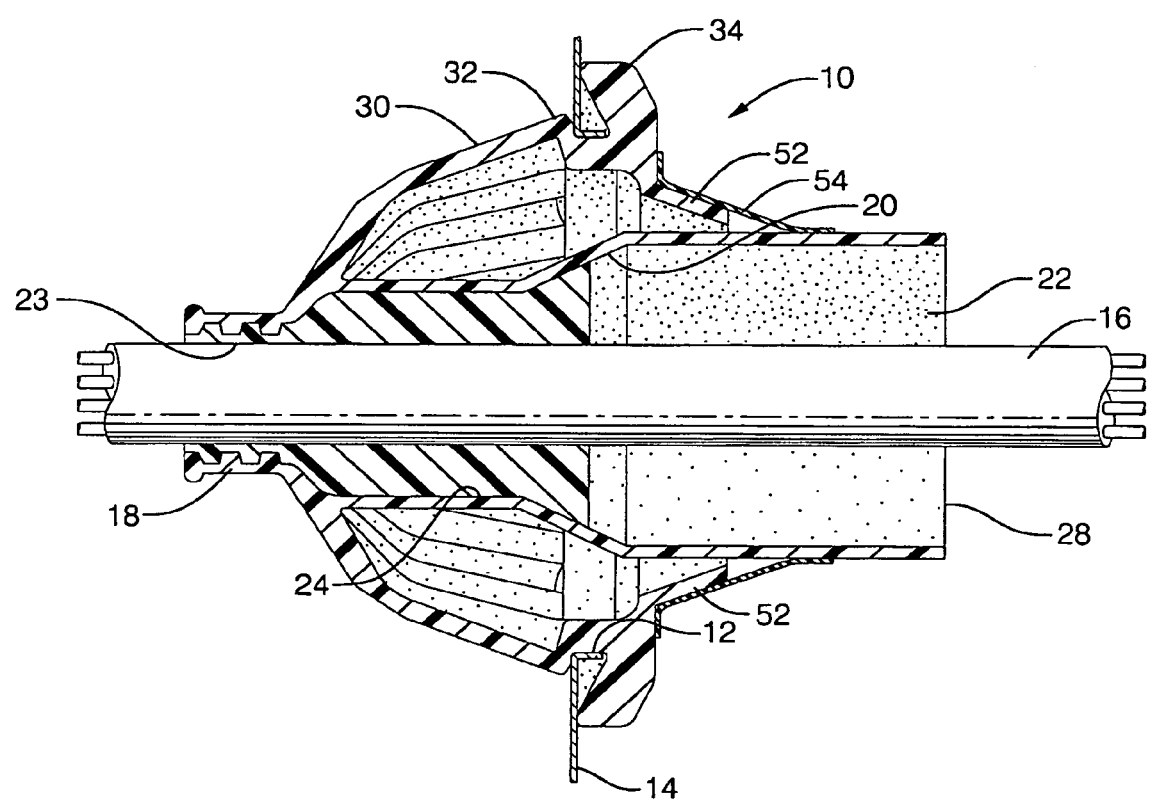
FIG. 9 is a longitudinal cross section of an exemplary grommet in accordance with the invention.

The rearward mounting flange 32 has an inner diameter 50 that is spaced radially outwardly of the tubular portion 20. Two thin, diametrically opposed, arcuate flaps 52 extend axially rearward from the inner diameter 50 of the rearward mounting flange 32. These flaps 52 provide an option to attach the rearward mounting flange 32 to the elongate tubular portion 20 with tape 54 as shown in FIG. 9. Attachment by tape 54 seals acoustic chamber 38 and/or increases the retention of the grommet 10 in mounting hole 12.

While the collapsible grommet 10 has been illustrated in connection with a bundle of wires 16, the collapsible grommet 10 can be used for sealing around any member that passes through a hole in a panel. In other words, while preferred embodiments and options have been shown and described, it will be apparent to those skilled in the art that various changes and modifications can be made without departing from the scope of the invention as defined by the appended claims and equivalents thereof.

What is claimed is:

1. A one-piece, molded elastomeric grommet for mounting in a hole that extends through a support panel for passing a member through the support panel comprising;

an elongate tubular portion defining a passage that extends from an inlet at one end of the tubular portion to an exit at an opposite end of the tubular portion, an umbrella portion that surrounds the tubular portion and that has a forward end that is integrally attached to the tubular portion so as to form an open ended acoustic chamber outwardly of the tubular portion, and a mounting portion at a rearward end of the umbrella portion comprising a forward mounting flange, the umbrella portion including a collapsible wall having a substantially uniform thickness and an undulate shape in a circumferential direction to facilitate insertion of the forward mounting flange through an undersized hole in a support panel.

2. The grommet as defined in claim 1 in combination with a member that is a non-round member that passes through the passage.

3. The grommet as defined in claim 1 in combination with a member that is a bundle of wires that passes through the passage and a sealant, the passage including a chamber that is filled with the sealant to pot the bundle of wires in the chamber.

4. The grommet as defined in claim 3 wherein the chamber has a minimum cross sectional area and the bundle of wires has a cross sectional area that is no greater than 40% of the minimum cross sectional area of the chamber.

5. A one-piece, molded elastomeric grommet for mounting in a hole that extends through a support panel for passing a member through the support panel comprising;

an elongate tubular portion defining a passage that extends from an inlet at one end of the tubular portion to an exit at an opposite end of the tubular portion, a collapsible bell shaped wall that surrounds the tubular portion and that has a forward end that is integrally attached to the tubular portion so as to form an open ended acoustic chamber outwardly of the tubular portion, and a mounting portion at a rearward end of the bell shaped wall that includes a forward mounting flange, the collapsible bell shaped wall having a portion of substantially uniform thickness and an undulate shape in a circumferential direction to facilitate insertion of the forward mounting flange through an undersized hole in a support panel.

6. A one-piece, molded elastomeric grommet for mounting in a hole that extends through a support panel for passing a member through the support panel comprising;

an elongate tubular portion defining a passage that extends from an inlet at one end of the tubular portion to an exit at an opposite end of the tubular portion, the elongate tubular portion having a seal sleeve at the opposite end of the tubular portion that defines a forward chamber of the passage, the passage further comprising a larger intermediate passage, and an even larger rearward passage that includes the inlet, a collapsible bell shaped wall that surrounds the intermediate chamber and that has a forward end that is integrally attached to a rearward end of the seal sleeve of the tubular portion so as to form an open ended acoustic chamber outwardly of the tubular portion, and a mounting portion at a rearward end of the bell shaped wall that includes a forward mounting flange and a rearward mounting flange, the rearward mounting flange having an inner diameter that is spaced radially outward of the tubular portion, and the collapsible bell shaped wall having a portion of substantially uniform thickness and an undulate shape in a circumferential direction to facilitate insertion of the forward mounting flange through an undersized hole in a support panel.

7. The grommet as defined in claim 6 in combination with a member that is a non-round member that passes through the passage.

8. The grommet as defined in claim 6 in combination with a member that is a bundle of wires that passes through the passage and a sealant that fills the intermediate chamber to pot the bundle of wires in the intermediate chamber.

9. The grommet as defined in claim 8 wherein the intermediate chamber has a minimum cross sectional area and the bundle of wires has a cross sectional area that is no greater than 40% of the minimum cross sectional area of the intermediate chamber.

10. The grommet as defined in claim 8 wherein the grommet includes a plurality of thin, diametrically opposed, arcuate flaps that extend axially rearward from the inner diameter of the rearward mounting flange.

11. The grommet as defined in claim 10 wherein the plurality of flaps are attached to the tubular portion to seal the acoustic chamber, to increase the retention of the grommet in a mounting hole or to seal the acoustic chamber and increase the retention of the grommet in a mounting hole.

12. The grommet as defined in claim 11 wherein the plurality of flaps are attached to the tubular portion by tape.

\* \* \* \* \*